(No Model.)
E. C. TAYLOR & D. N. LIGHTFOOT.
POST HOLE DIGGER.
No. 413,108. Patented Oct. 15, 1889.
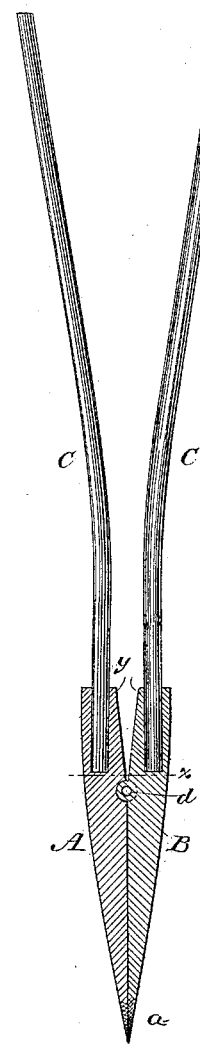
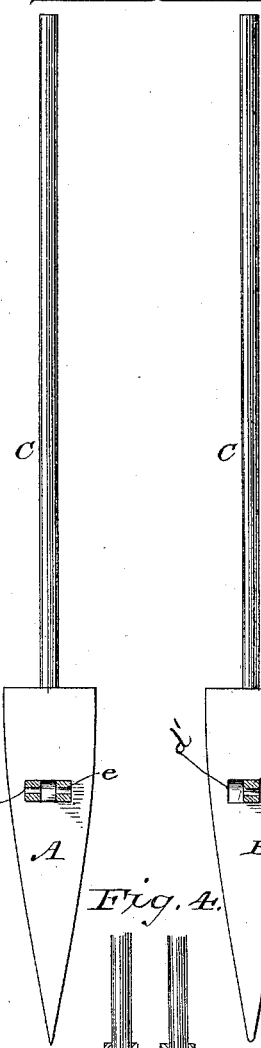
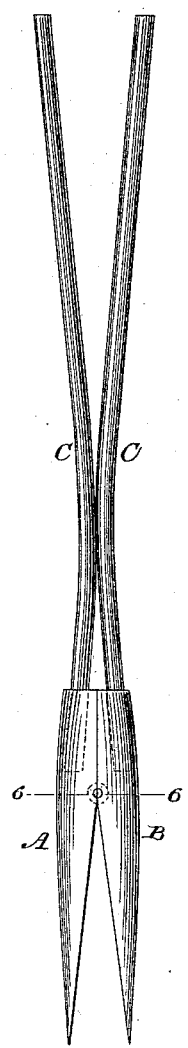
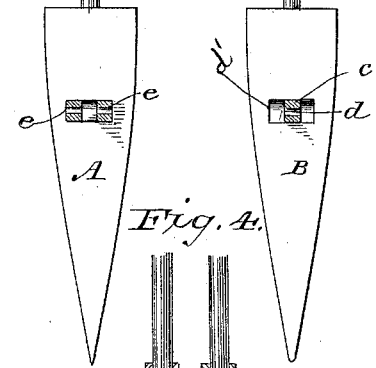
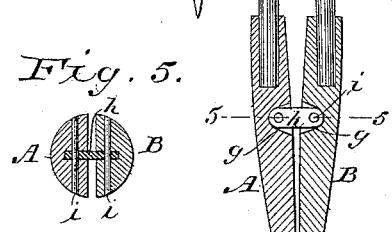
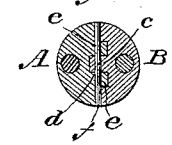
Witnesses
H. C. Newman.
E. S. Newman.
Inventor
Elbert C. Taylor.
David N. Lightfoot,
By their Attorneys
Baldwin, Davidson & Wight

UNITED STATES PATENT OFFICE.

ELBERT C. TAYLOR AND DAVID N. LIGHTFOOT, OF HUMANSVILLE, MISSOURI, ASSIGNORS, BY DIRECT AND MESNE ASSIGNMENTS, OF ONE-HALF TO JOHN S. LIGHTFOOT, ALFRED W. MITCHELL, JOHN R. AKINS, G. F. KERSEY, AND D. G. KERSEY, ALL OF SAME PLACE.

POST-HOLE DIGGER.

SPECIFICATION forming part of Letters Patent No. 413,108, dated October 15, 1889.

Application filed May 16, 1889. Serial No. 310,970. (No model.)

*To all whom it may concern:*

Be it known that we, ELBERT C. TAYLOR and DAVID N. LIGHTFOOT, both citizens of the United States, and both residing at Humansville, in the county of Polk and State of Missouri, have jointly invented certain new and useful Improvements in Post-Hole Diggers, of which the following is a specification.

The object of our invention is to provide an implement for digging holes for fence-posts, trees, plants, &c., in such manner that the hole may be of substantially uniform width from top to bottom, and so constructed that the implement is strong, durable, and easily manipulated.

Our invention consists in forming the working end or head of the digger in two parts or sections each provided with a separate handle, and hinged together so as to open and close to regulate the width of the hole.

Our invention also consists in certain details of construction hereinafter described and claimed.

In the accompanying drawings, Figure 1 is a vertical section through the head of our improved post-hole digger, showing the handles in elevation. Fig. 2 is a view of the inner faces of the digger-sections. Fig. 3 is a side elevation. Fig. 4 is a view, partly in section, of a modification. Fig. 5 is a cross-section of the same on the line 5 5 of Fig. 4. Fig. 6 is a cross-section on the line 6 6 of Fig. 3.

The head or working end of the digger is made in two parts A and B, similar in form, each one-half of a cone. As shown in Fig. 1, the sections are together, forming a complete cone, the lower end or point $a$ of the two sections preferably being chilled or hardened, and the main body or section of the head being formed of cast-iron. The inner faces of the sections A and B below the line $x$ are made plane and even, so that they lie close together. Above the line $x$ the sections A and B on their inner sides are inclined outwardly at $y$, leaving a space between them. When the sections are in the positions shown in Fig. 1, it is their position when the implement is raised and lowered or driven into the ground to form the hole. Each section A and B is provided with a handle C, securely fastened to the upper end thereof, preferably by being cast thereto, and may be made of iron rod, gas-pipe, or of other suitable form. Preferably the handles are bent outwardly, as shown, to allow for their being moved toward and from each other when the sections are moved inwardly and outwardly relatively to each other to increase the width of the hole at the lower end. The section B is formed with a recess $d'$ and a lug $c$, projecting from its inner face and provided with a transverse hole $d$. The section A is provided with two lugs $e$, between which the lug $c$ fits. A bolt $f$ extends through holes in the lugs $e$ and through the hole $d$ in the lug $c$, thus hinging the two sections A and B together. The bolt $f$ extends entirely through the section B, and may be inserted and withdrawn from the outside.

In operation the implement with the parts in position, as shown in Fig. 1, is successively raised and lowered, or raised and let fall into the ground, which will make a conical hole therein. When the hole has obtained a slight depth and the implement is within the hole, the handles should be forced together, thus forcing apart the lower ends or points of the working-head, so as to enlarge the hole at its lower end. In making the hole the implement should be turned around to assume different positions, and thus more effectually produce a hole of uniform diameter from top to bottom.

In Fig. 4 a modified way of connecting together the sections of the head is shown. In this instance a recess is formed in each section A and B, near its upper end, and a link $h$, projecting into the recesses, is secured in position by pins or bolts $i$. This construction admits of slight flexibility, and may be of advantage for some kinds of work.

Having thus described our invention, what we claim as our invention is—

1. The combination, substantially as hereinbefore set forth, of the solid conical working ends A and B, formed in two parts hinged together near their upper ends, but below the top, and provided with upwardly-inclined faces $y$ above the hinge-connection, and each provided with a handle projecting upwardly and then inclined outwardly.

2. The combination, substantially as hereinbefore set forth, of the working end or head formed of two sections A and B, the section B being formed with a recess $d'$ and a lug $c$ on its inner face, and section A formed with a pair of lugs $e$, between which the lug $c$ extends, and a bolt for securing the lugs together and forming a hinge-connection between the sections A and B.

In testimony whereof we have hereunto subscribed our names.

ELBERT C. TAYLOR.
DAVID N. LIGHTFOOT.

Witnesses:
J. S. LIGHTFOOT.
A. W. MITCHELL.